(12) United States Patent
Kim

(10) Patent No.: US 9,684,158 B2
(45) Date of Patent: Jun. 20, 2017

(54) REFERENCE MIRROR CONVERTER OF LINNIK INTERFEROMETER

(71) Applicant: GL-Tech Co., Ltd., Daejeon (KR)

(72) Inventor: Ho Hwan Kim, Daejeon (KR)

(73) Assignee: GL-Tech Co., Ltd., Daejeon (KR)

( * ) Notice: Subject to any disclaimer, the term of this patent is extended or adjusted under 35 U.S.C. 154(b) by 57 days.

(21) Appl. No.: 14/893,260

(22) PCT Filed: Nov. 20, 2014

(86) PCT No.: PCT/KR2014/011157
§ 371 (c)(1),
(2) Date: Nov. 23, 2015

(87) PCT Pub. No.: WO2015/190657
PCT Pub. Date: Dec. 17, 2015

(65) Prior Publication Data
US 2016/0187124 A1    Jun. 30, 2016

(30) Foreign Application Priority Data
Jun. 9, 2014    (KR) .......................... 10-2014-0069591

(51) Int. Cl.
*G02B 21/00*    (2006.01)
*G01B 9/04*    (2006.01)
(Continued)

(52) U.S. Cl.
CPC ..... *G02B 21/0056* (2013.01); *G01B 9/02041* (2013.01); *G01B 9/02049* (2013.01);
(Continued)

(58) Field of Classification Search
CPC ............ G01B 11/2441; G01B 9/02058; G01B 11/306; G01B 9/02049; G01B 9/02041;
(Continued)

(56) References Cited

U.S. PATENT DOCUMENTS 4,874,955 A    10/1989    Uesugi et al.
2004/0021922 A1*    2/2004    Chen .................. G01N 21/4795
                                                      359/212.2
(Continued)

FOREIGN PATENT DOCUMENTS

KR    1992-0010550 B1    12/1992

*Primary Examiner* — Michael P Lapage
(74) *Attorney, Agent, or Firm* — Novick, Kim & Lee, PLLC; Sang Ho Lee

(57) ABSTRACT

Provided is a reference mirror converter of a Linnik interferometer in which a first object lens 30 focuses light emitted from a beam splitter 20 on a reference mirror 40, a plurality of reference mirrors 40 reflects light incident from the first object lens 30, a plurality of reference mirrors 40 is disposed on a plurality of reference mirror brackets 45, respectively, the plurality of reference mirror brackets 45 is disposed on a rotary plate 60 at the same angles, and the rotary plate 60 is rotated using a motor 70 to control a rotation of the rotary plate 60 to select the reference mirror 40 having a reflectivity similar to that of a target 200 to be measured from among the plurality of reference mirrors 40. Accordingly, since a separate state between articles is maintained at all times, adhesiveness between articles packaged with an easily adhesive material may be prevented.

8 Claims, 7 Drawing Sheets

(51) Int. Cl.
  *G01B 9/02* (2006.01)
  *G01B 11/24* (2006.01)
  *G02B 21/14* (2006.01)
  *G02B 21/18* (2006.01)
  *G01B 11/30* (2006.01)
  *G02B 21/24* (2006.01)

(52) U.S. Cl.
  CPC ............ *G01B 9/02058* (2013.01); *G01B 9/04* (2013.01); *G01B 11/2441* (2013.01); *G01B 11/306* (2013.01); *G02B 21/0004* (2013.01); *G02B 21/14* (2013.01); *G02B 21/18* (2013.01); *G02B 21/248* (2013.01)

(58) Field of Classification Search
  CPC ...... G01B 9/04; G02B 21/0004; G02B 21/14; G02B 21/18; G02B 21/248; G02B 21/0056
  See application file for complete search history.

(56) References Cited

U.S. PATENT DOCUMENTS

| | | | |
|---|---|---|---|
| 2004/0114151 A1* | 6/2004 | Tanno | G01N 21/4795 356/497 |
| 2005/0140981 A1* | 6/2005 | Waelti | A61B 3/1005 356/479 |
| 2008/0137933 A1* | 6/2008 | Kim | G01B 9/021 382/131 |
| 2008/0259428 A1* | 10/2008 | Zimdars | G02B 26/06 359/211.1 |
| 2009/0237675 A1* | 9/2009 | Nishizawa | G01B 11/0608 356/511 |
| 2012/0307258 A1* | 12/2012 | Koerner | G01B 9/0209 356/497 |
| 2013/0235453 A1* | 9/2013 | Becker | G02B 21/248 359/381 |
| 2013/0335706 A1* | 12/2013 | Schmitt-Manderbach | A61B 3/1005 351/221 |

* cited by examiner

REFERENCE MIRROR CONVERTER OF LINNIK INTERFEROMETER

TECHNICAL FIELD

Example embodiments relate to a reference mirror converter of a Linnik interferometer, and more particularly, to a reference mirror converter of a Linnik interferometer that enables a two-dimensional (2D) measurement by shielding light reflected from a reference mirror and thereby preventing an occurrence of interference using a Linnik-typed interference lens stereoscope, and may enhance the visibility and intensity of a three-dimensional (3D) image by selecting a reference mirror having a reflectivity similar to that of a target to be measured from among a plurality of reference mirrors.

RELATED ART

An interference microscope refers to a microscope using an interference phenomenon of light. If light emitted from the same point is split into two at a time and put together again, a phase difference between two wavy surfaces is constant. Thus, a degree of illumination of an observing place shows the uniform distribution in terms of a place.

As a microscope capable of observing an unevenness  of a subject or a difference in an optical thickness of the subject using such interference of light based on a difference in contrast or color, a refractive differentiation interference microscope has been distributed for the purposes of a biological microscope.

Types of an interference lens may include a Michelson type, a Mirau type, and a Linnik type. Here, the Michelson type is provided in a structure in which Work Distance (W.D) of five times or less is secured compared to that of a low magnification interference lens. The Mirau type is provided in a structure in which the W.D of ten times or more is secured. The Linnik type may cause interference in all of magnifications.

Measurement principles thereof will be described with reference to FIG. 1. FIG. 1 illustrates a light source 1, a translucent glass 2, a reference mirror 3, an object lens 4, and a target 5 to be measured. The measurement principles have been conceived into consideration of a phenomenon that, since a portion in which a difference between lengths of two optical paths of light corresponds to even folds of λ/2 (λ: wavelength of light) appears bright and a portion in which the difference corresponds to odd folds of λ/2 appears dark due to interference between light reflected from the surface of the target 5 and light reflected from the reference mirror 3, a contour pattern 6 of λ/2 pitch appears on the target surface. Here, the difference between the lengths of optical paths has an effect at a point at which the difference reaches twice of unevenness amounts of the target surface.

While the interference microscope is advantageous in observing the overall shape of a target to be measured at a high location generally or intuitively, the interference microscope is disadvantageous in quantitatively verifying the shape of the target. In this regard, the interference microscope was not readily applied to a shape measurement.

However, as illustrated in FIG. 1, due to an interference pattern that is generated as a phenomenon that two waves encounter and perform reinforcing and extinctive interference, an interference lens cannot easily two-dimensionally measure a diameter of a circle. That is, the interference lens may not readily perform binarization processing.

When the interference pattern is removed, a two-dimensional (2D) measurement may be performed. Thus, as for currently commercialized technology, a principle of performing a three-dimensional (3D) measurement includes an AFM method, an optical interference (interferometry) method, a laser confocal method, an optical triangulation method, and the like.

Initially, the AFM method has a relatively excellent height resolving power, however, cannot measure a relatively large scale and a relatively high step. Further, the optical triangulation method is advantageous in measuring a relatively large scale and a relatively high step, however, has a relatively poor height resolving power and thus, cannot measure a nano unit.

Currently, the laser confocal method using an object lens may perform a 2D measurement and a 3D measurement. However, the laser confocal method has a varying height resolving power based on a depth of focus of the object lens and has a degraded height resolving power compared to the principle of optical interference.

To outperform the issues found in the interference microscope that is advantageous in observing the overall shape of a target to be measured at a high location generally or intuitively, however, is disadvantageous in quantitatively verifying the shape of the target, the art titled "*shape measuring method and system of 3D curved surface*" using interference of light to quantitatively and quickly perform a measurement is disclosed in Korean Patent Publication No. 10-1992-0010550.

However, even in this art, still remains the issue that the interference microscope cannot perform a 2D measurement due to an interference phenomenon.

DETAILED DESCRIPTION

Objects

The present disclosure is conceived to outperform the aforementioned issues and an aspect provides a reference mirror converter of a Linnik interferometer that may perform a two-dimensional (2D) measurement by shielding light reflected from a reference mirror and thereby removing an interference pattern.

Another aspect provides a reference mirror converter of a Linnik interferometer that may enhance the visibility and intensity of an image by selecting a reference mirror having a reflectivity similar to that of a target to be measured.

Solutions

To achieve the aforementioned objects, a reference mirror converter of a Linnik interferometer according to example embodiments includes a second object lens configured to enable a camera to take a picture of an image magnified from a target to be measured; a beam splitter configured to transmit or reflect a portion of light irradiated from a light source or a portion of light emitted from the second object lens to be directed toward the camera, and to direct the remaining light toward a reference mirror; a first object lens configured to focus light emitted from the beam splitter on the reference mirror; a plurality of reference mirrors configured to reflect light incident from the first object lens; a plurality of reference mirror brackets configured to support the plurality of reference mirrors, respectively; a rotary plate on which the plurality of reference mirror brackets is disposed at the same angles; a motor configured to generate a rotational force for rotating the rotary plate; an initial rotation angle sensor configured to sense an initial rotation angle of the rotary plate; and a control device configured to rotate the rotary plate by controlling a driving of the motor in response to a command of a user, to sense an initial rotation angle using the initial rotation angle sensor, and to control a rotation of the rotary plate to select a desired reference mirror from among the plurality of reference mirrors.

A plurality of bracket holes may be formed on the rotary plate to dispose the plurality of reference mirror brackets, respectively, and a portion on which the bracket hole is absent may serve as a shielding plate configured to shield the light incident from the first object lens instead of reflecting the light, thereby enabling a two-dimensional (2D) measurement.

A focus adjust groove may be formed on a front surface of the reference mirror bracket to traverse a center of the reference mirror bracket, and the reference mirror bracket may move forward or backward to adjust an optical path of the first object lens and an optical path of the second object lens to match by inserting a rotating device into the focus adjust groove and thereby rotating the reference mirror bracket clockwise (in a right-handed screw direction) or counterclockwise.

A plurality of tilting adjust screws may be disposed at preset angles along the circumference of each of the plurality of reference mirror brackets to adjust an optical path of the first object lens and an optical path of the second object lens to match with respect to the light incident from the first object lens, and thereby adjust a central optical axis of the first object lens and a reference mirror plane to constitute a normal.

A reference mirror bracket fastening device may be disposed at a location corresponding to each of the plurality of reference mirror brackets on the side of the rotary plate to fasten the reference mirror bracket in a tilting-adjusted state and in a state in which the optical path of the first object lens and the optical path of the second object lens are adjusted to match.

The reference mirror bracket fastening device may fasten a bracket set screw by forming a set screw hole along the side of the rotary plate and by disposing a fastening member made using synthetic resin.

Effect

According to example embodiments, it is possible to enable a two-dimensional (2D) measurement by disposing a plurality of reference mirrors on a rotary plate, by configuring a reference mirror-free portion, and by preventing interference from occurring when the reference mirror-free portion comes into a focus of an object lens. Further, it is possible to enhance the visibility and intensity of a three-dimensional (3D) image by selecting a reference mirror having a reflectivity similar to that of a target to be measured from the plurality of reference mirrors.

BEST MODE

Hereinafter, example embodiments will be described with reference to the accompanying drawings.

Figure 1:
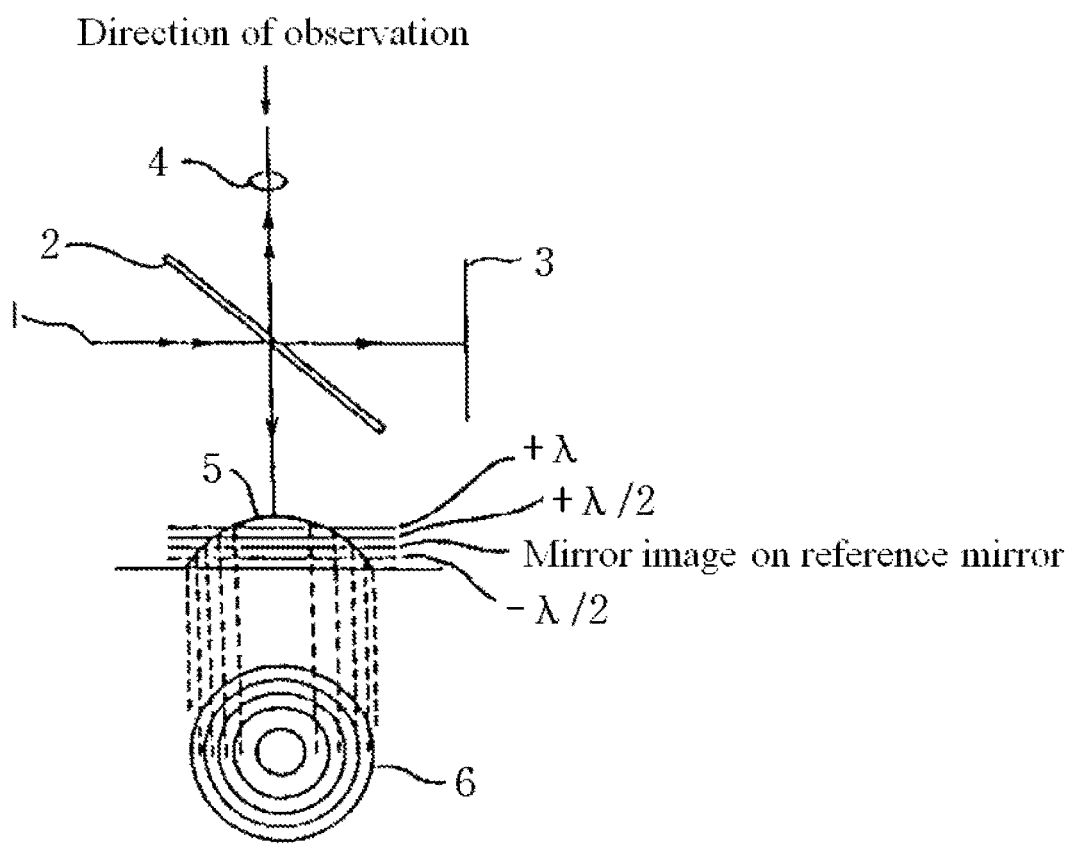
FIG. 1 illustrates a principle of an interference microscope according to the related art.
Figure 2:
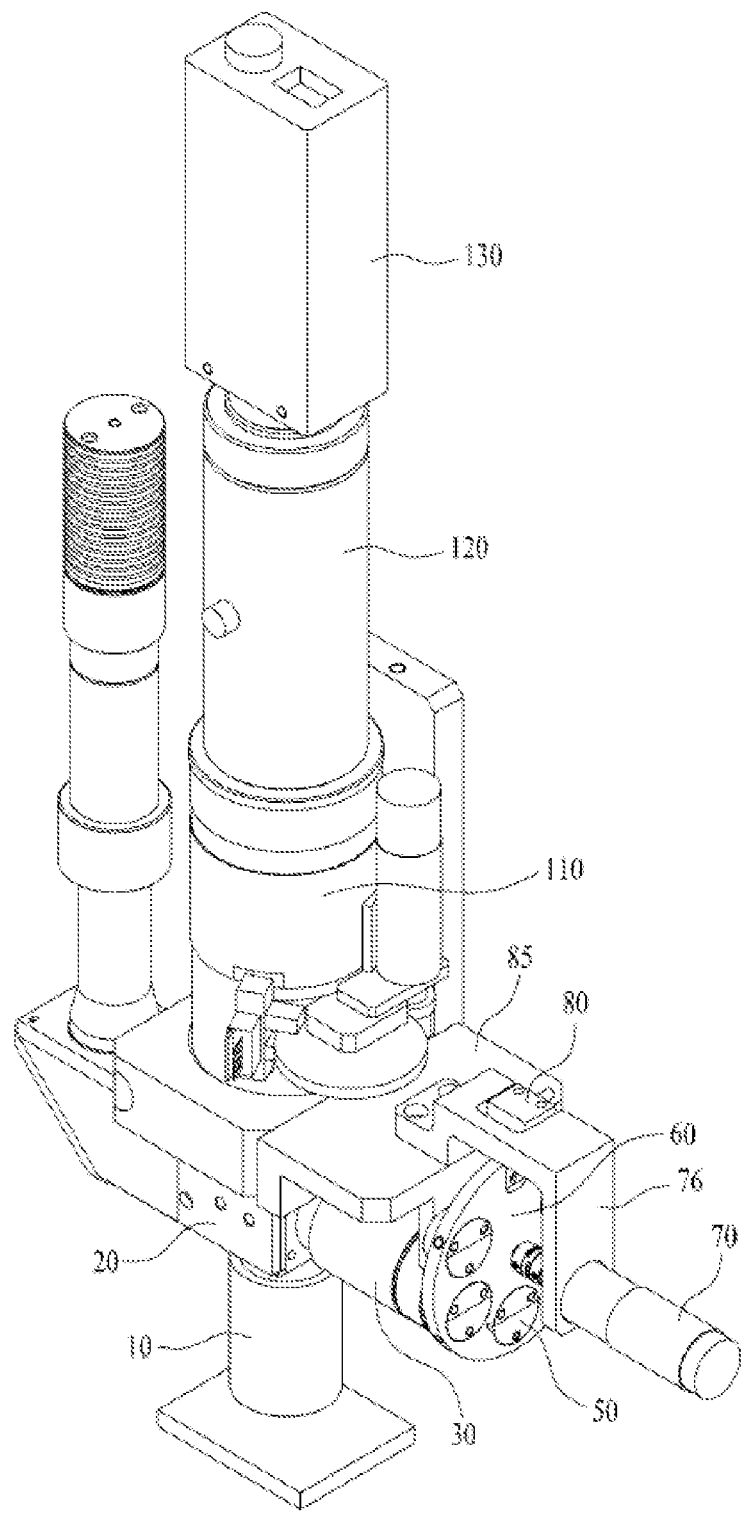
FIG. 2 is a perspective view and FIG. 3 is a cross-sectional view illustrating a configuration of a reference mirror converter of a Linnik interferometer according to example embodiments.
Figure 3:
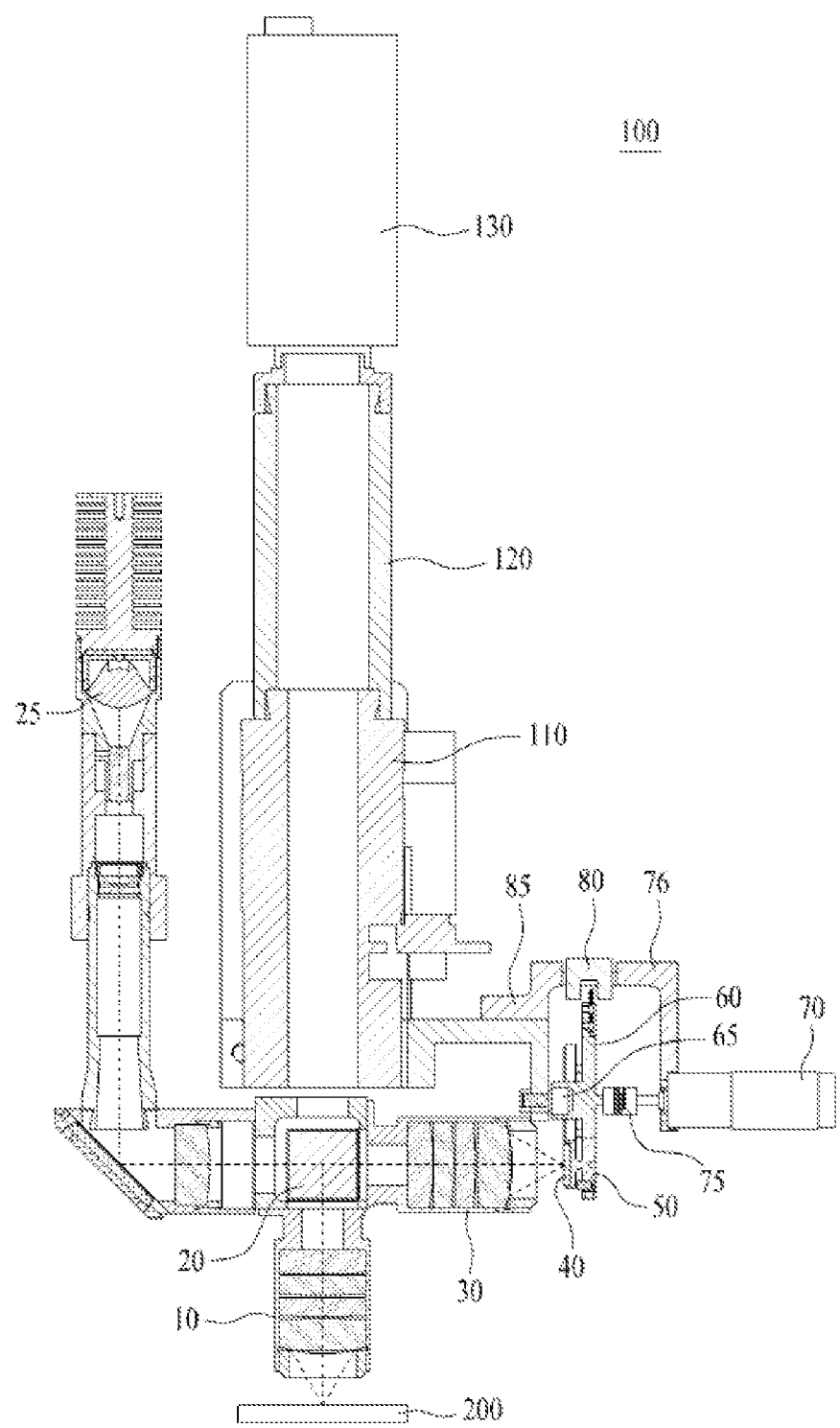

FIG. 2 is a perspective view and FIG. 3 is a cross-sectional view illustrating a configuration of a reference mirror converter of a Linnik interferometer according to example embodiments.

A reference mirror converter 100 according to example embodiments includes a second object lens 10 configured to focus an image magnified from a target 200 to be measured on a zoom lens 110 and a focusing lens 120, to magnify again the focused image at the zoom lens 110 and the focusing lens 120, and to enable a camera 130 to take a picture of the image; a beam splitter 20 configured to reflect a portion of light irradiated from a light source 25 or a portion of light emitted from the second object lens 10 to be directed toward the camera 130 through the zoom lens 110 and the focusing lens 120 and to direct the remaining light toward a reference mirror 40; a first object lens 30 configured to focus light emitted from the beam splitter 20 on the reference mirror 40; a plurality of reference mirrors 40 configured to reflect light incident from the first object lens 30; a plurality of reference mirror brackets 50 configured to support the plurality of reference mirrors 40, respectively; a rotary plate 60 on which the plurality of reference mirror brackets 45 is disposed at the same angles; a motor 70 configured to generate a rotational force for rotating the rotary plate 60; an initial rotation angle sensor 80 configured to sense an initial rotation angle of the rotary plate 60; and a control device configured to rotate the rotary plate 60 by controlling a driving of the motor 70 in response to a command for selecting the specific reference mirror 40 input from a user, to sensing an initial rotation angle using the initial rotation angle sensor 80, and to control a rotation of the rotary plate 60 to select the desired reference mirror 40 from among the plurality of reference mirrors 40.

Reference numerals not described herein, "75" denotes a coupling configured to transfer the rotational force of the motor 70 to the rotary plate 60, "65" denotes a bearing configured to decrease a friction on a rotating shaft of the rotary plate 60, "85" denotes a rotary plate support configured to support the rotary plate 60, and "76" denotes a motor bracket configured to support the motor 70 against the rotary plate support 85.

The reference mirror converter 100 of the Linnik interferometer according to example embodiments enables a three-dimensional (3D) measurement of the target 200 by causing interference between light reflected from the target 200 and light reflected from the reference mirror 40 and thereby generating an interference pattern on the magnified image of the target 200.

When a reflectivity of the target 200 and a reflectivity of the reference mirror 40 differ from each other, the visibility and intensity of the image may be decreased. Accordingly, the interferometer enables a first reference mirror 40a having a reflectivity similar to that of the target 200 to be selected from among the plurality of reference mirrors 40 by rotating the rotary plate 60 on which the plurality of reference mirror brackets 45 is disposed with the motor 70.

In response to the command for selecting the specific reference mirror 40, for example, the first reference mirror 40a, input from the user into the control device, the control device applies the rotational force generated from the motor 70 to the rotary plate 60 through the coupling 75, for example, a flexible coupling and the like, and rotates the rotary plate 60 with the applied rotational force by controlling the motor 70, senses the initial rotation angle using the initial rotation angle sensor 80 in response to the rotation of the rotary plate 60, and controls a rotation of the rotary plate 60 to select the desired reference mirror 40, for example, the first reference mirror 40a, having the reflectivity similar to that of the target 200 from among the plurality of reference mirrors 40. Here, a description related to the control device will be omitted.

Figure 4:
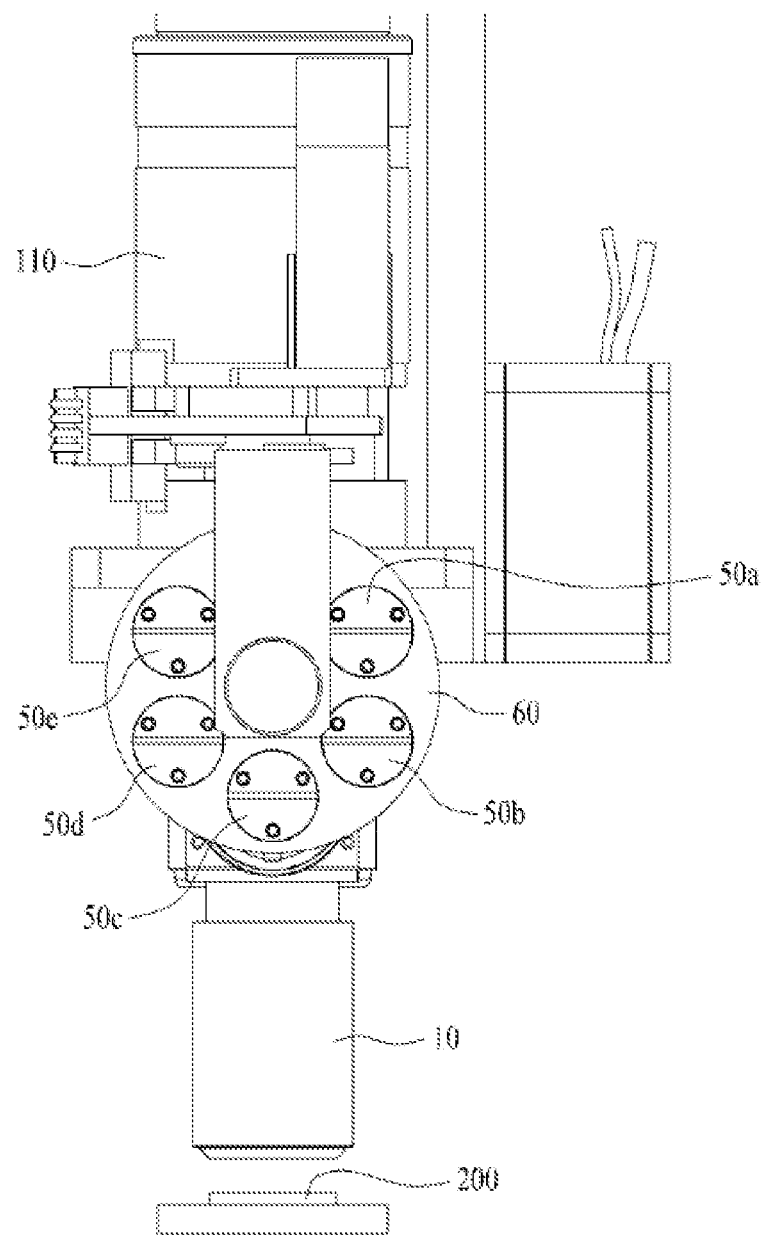
FIG. 4 is a side view observed at the side of the reference mirror converter to view a rotary plate from the front according to example embodiments.
Figure 5:
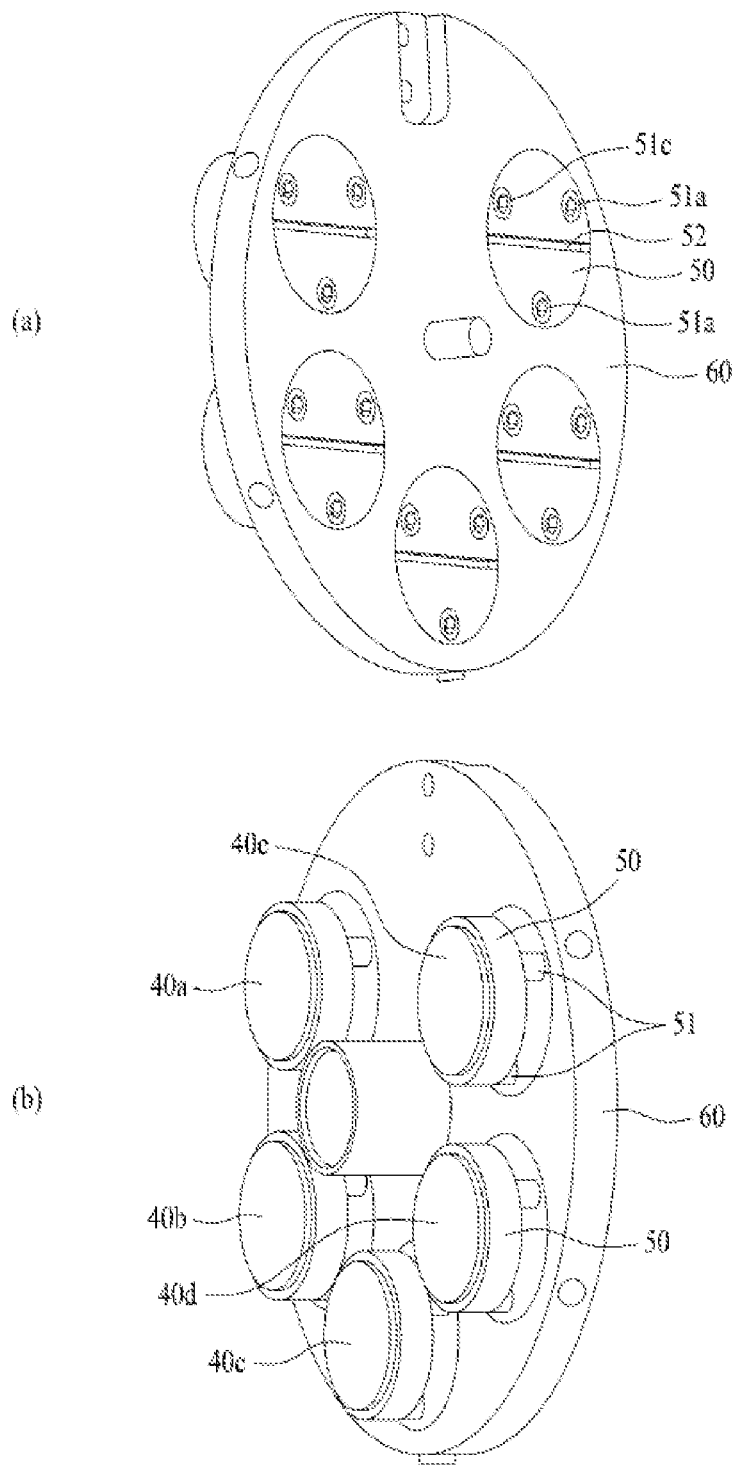
FIG. 5, parts (a) and (b), are perspective views illustrating a front and a rear of the rotary plate according to example embodiments.
Figure 6:
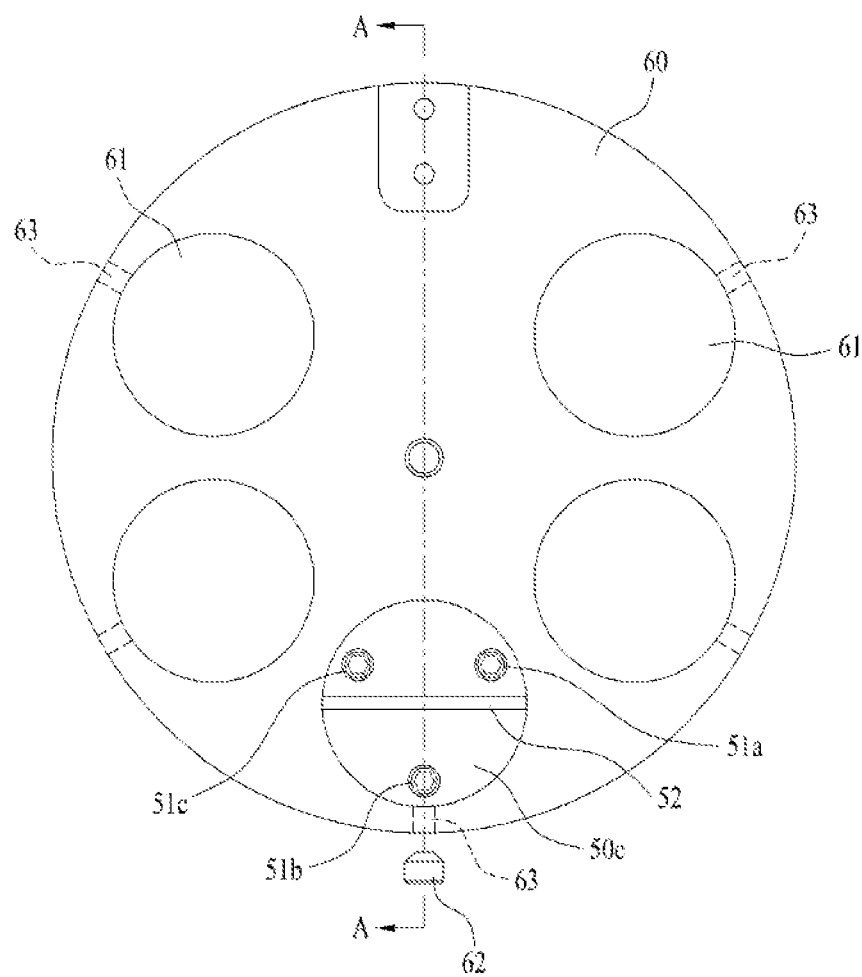
FIG. 6 is a front view of the rotary plate according to example embodiments.
Figure 7:
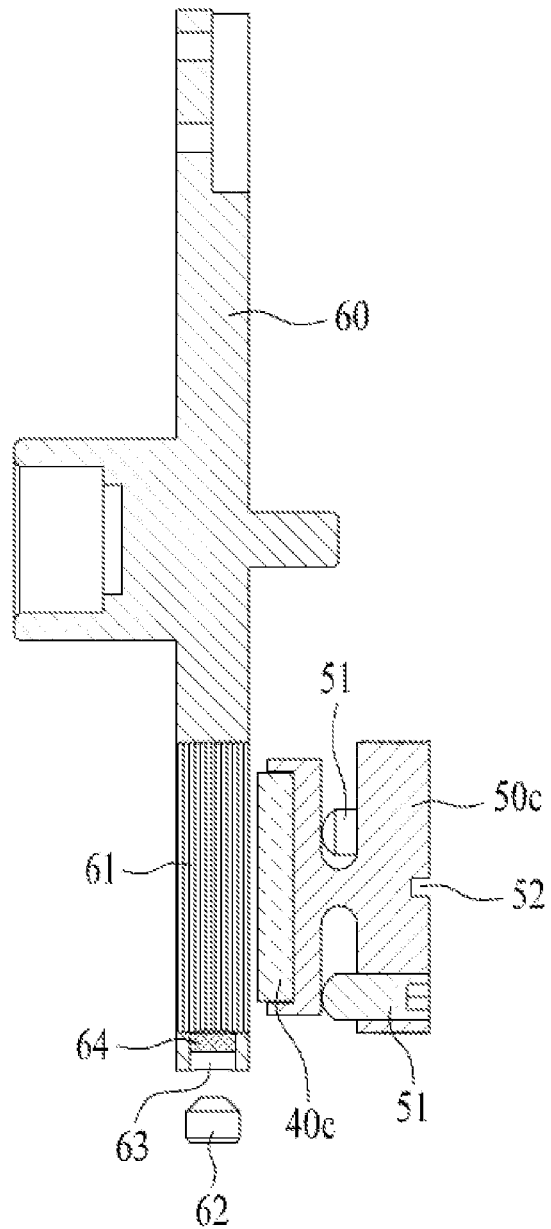
FIG. 7 is a cross-sectional view cut along line A-A of FIG. 6.

FIG. 4 is a side view observed at the side of the reference mirror converter to view a rotary plate from the front according to example embodiments, and FIG. 5, parts (a) and (b), are perspective views illustrating a front and a rear of the rotary plate according to example embodiments. FIG. 6a is a front view of the rotary plate according to example embodiments, and FIG. 6b is a cross-sectional view cut along line A-A of FIG. 6.

The rotary plate 60 according to example embodiments is provided in a form of a circular plate, five bracket holes 61 are formed at the angle of 60° on the rotary plate 60 to dispose five reference mirror brackets 50a, 50b, 50c, 50d, and 50e, respectively, and a portion on which the bracket hole 61 is absent serves as a shielding plate configured to shield the light incident from the first object lens 30 instead of reflecting the light, thereby enabling a two-dimensional (2D) measurement. Here, the shielding plate refers to a rotary plate itself on which the reference mirror bracket 50 is not disposed.

As illustrated in part (b) of FIG. 5, the reference mirror 40 is attached on the other surface of each of the five reference mirror brackets 50a, 50b, 50c, 50d, and 50e. In detail, five reference mirrors 40a, 40b, 40c, 40d, and 40e, each having a different reflectivity, are attached on the other surface of the five reference mirror brackets 50a, 50b, 50c, 50d, and 50e, respectively.

Here, when referring to five first through fifth reference mirror brackets 50a, 50b, 50c, 50d, and 50e individually, an alphabet small letter such as "a" and the like is added to "50", such as indicating a first reference mirror bracket with "50a", for example. However, when representatively indicating the same, the representative reference numeral "50" is used. The same principle is applied to other constituent elements such as the reference mirror 40 and the like.

Although five reference mirrors 40 are attached to five reference mirror brackets 50, respectively, in the present example embodiments, it is only an example. If necessary, six, eight, or more reference mirror brackets 50 may be disposed and the number of reference mirrors 40 corresponding thereto may be attached thereto.

Also, an optical path adjust groove 52 is formed on the front surface of the reference mirror bracket 50 to traverse a center of the reference mirror bracket 50. A plurality of, for example, three tilting adjust screws 51a, 51b, and 51c are disposed at preset angles, for example, 120° and the like, along the circumference of the reference mirror bracket 50.

When the desired third reference mirror 40c is selected to come into, that is, be located at a focus of the first object lens 30 through rotation using the motor 70 in order to select the reference mirror 40 having a reflectivity similar to that of the target 200, the reference mirror bracket 50 moves forward or backward to adjust an optical path of the first object lens 30 and an optical path of the second object lens 10 to match by inserting a rotating device, for example, a driver and the like, into the optical path adjust groove 52 and thereby rotating the reference mirror bracket 50 clockwise (in a right-handed screw direction) or counterclockwise, while viewing an image being taken at the camera 130.

Although the selected third reference mirror 40 is adjusted to match the optical path of the first object lens 30 and the optical path of the second object lens 10, interference patterns may not be disposed at constant intervals on the image being taken at the camera 130. In this case, the selected reference mirror 40 may be tilted toward one side and thus, the selected third reference mirror 40c is adjusted to be vertical (normal) with respect to the light incident from the first object lens 30 by adjusting the first through third tilting adjust screws 51a, 51b, and 51c.

For example, when rotating the first tilting adjust screw 51a clockwise or counterclockwise with a driver to move forward or backward, a tilting of a portion, for example, a second upper limit when the image taken at the camera 30 is divided into four upper limits, corresponding to the first tilting adjust screw 51a is adjusted. Accordingly, three tilting adjust screws 51 may adjust tiltings of three portions of the reference mirror 40, respectively, so that light reflected from the selected third reference mirror 40c may proceed along the same path as a path of incident light.

Although tiltings of three portions of the reference mirror 40 are adjusted by disposing three tilting adjust screws 51, respectively, in the present example embodiments, it is only an example. If necessary, a tilting may be adjusted in three or more portions of the selected reference mirror 40 by disposing three or more tilting adjust screws 51 on the selected reference mirror 40.

When the adjustment is completed, the reference mirror bracket 50 is fastened in a tilting-adjusted state and in a state in which the optical path of the first object lens 30 and the optical path of the second object lens 10 are adjusted to match by forming a set screw hole 63 at a location corresponding to each of the five reference mirror brackets 50a, 50b, 50c, 50d, and 50e along the side of the rotary plate 60 and by disposing a fastening member 64 made using synthetic resin, for example, acetyl and by fastening the bracket set screw 62 into the fastening member 64.

According to example embodiments, a 2D measurement is enabled by forming, on the rotary plate 60, a portion on which the reference mirror 40 is not disposed, by enabling light incident from the first object lens 30 to become extinct without being reflected, and thereby preventing interference from occurring in the beam splitter 20 and enabling light emitted from the second object lens 10 to proceed upward through the zoom lens 110 and the focusing lens 120 so that a picture of an image may be taken at the camera 130.

Although the Applicant(s) have described various example embodiments, the example embodiments are only an example to achieve the technical spirit of the present disclosure and thus, it would be appreciated by those skilled in the art that changes or modifications may be made to the example embodiments without departing from the principles and spirit of the present disclosure, the scope of which is defined by the claims and their equivalents.

What is claimed is:
1. A reference interferometer comprising:
 a second object lens magnifying an image of a target object into a first image;
 a camera capturing the first image;
 a beam splitter directing a portion of a first light irradiated from a light source or a portion of a second light emitted from the second object lens to the camera and to one of a plurality of reference mirrors by penetrating or reflecting;

a first object lens focusing a third light emitted from the beam splitter on the one of the plurality of reference mirrors, wherein the plurality of reference mirrors reflect the third light incident from the first object lens;

a plurality of reference mirror brackets supporting the plurality of reference mirrors, respectively, wherein each of the plurality of reference mirror brackets is disposed at a rotary plate and has a substantially same central angle with respect to a center of the rotary plate;

a motor generating a rotational force to the rotary plate;

an initial rotation angle sensor sensing an initial rotation angle of the rotary plate; and a control device rotating the rotary plate by controlling the motor in response to a command of a user, sensing an initial rotation angle using the initial rotation angle sensor, and controlling a rotation of the rotary plate to select at least one of the plurality of reference mirrors.

2. The reference interferometer of claim 1, wherein the rotary plate has a plurality of bracket holes to accommodate the plurality of reference mirror brackets, respectively, and wherein a portion of the plurality of bracket holes are blocked to shield the third light incident from the first object lens instead of reflecting the third light, enabling a two-dimensional (2D) measurement.

3. The reference interferometer of claim 2, wherein a front surface of at least one of the plurality of reference mirror brackets has a focus adjust groove to traverse a center thereof, and the at least one of the plurality of reference mirror brackets moves forward or backward to adjust an optical path of the first object lens and an optical path of the second object lens to match one another.

4. The reference mirror converter of claim 2, wherein a plurality of tilting adjust screws are disposed at preset angles along the circumference of each of the plurality of reference mirror brackets to adjust an optical path of the first object lens and an optical path of the second object lens to match with respect to the third light incident from the first object lens, and to adjust a central optical axis of the first object lens normal to a reference mirror plane.

5. The reference interferometer of claim 1, wherein a front surface of at least one of the plurality of reference mirror brackets has a focus adjust groove to traverse a center thereof, and the at least one of the plurality of reference mirror brackets moves forward or backward to adjust an optical path of the first object lens and an optical path of the second object lens to match one another by.

6. The reference interferometer of claim 1, wherein a plurality of tilting adjust screws are disposed at preset angles along the circumference of each of the plurality of reference mirror brackets to adjust an optical path of the first object lens and an optical path of the second object lens to match with respect to the third light incident from the first object lens, and to adjust a central optical axis of the first object lens normal to a reference mirror plane.

7. The reference interferometer of claim 6, wherein a reference mirror bracket fastener is disposed at a location corresponding to each of the plurality of reference mirror brackets on the side of the rotary plate to fasten each of the plurality of reference mirror brackets in a tilting-adjusted state and in a state in which the optical path of the first object lens and the optical path of the second object lens are adjusted to match.

8. The reference interferometer of claim 7, wherein the reference mirror bracket fastener fastens a bracket set screw by forming a set screw hole along the side of the rotary plate and by disposing a fastener of synthetic resin.

* * * * *